W. S. DARLEY.
INSTRUMENT FOR LOCATING BURIED OBJECTS.
APPLICATION FILED MAR. 19, 1918.

1,351,556. Patented Aug. 31, 1920.

Witnesses:
C. E. Wessels.
B. G. Richards

Inventor:
William S. Darley,
By Joshua R. H. Potts
Attorney.

UNITED STATES PATENT OFFICE.

WILLIAM S. DARLEY, OF CHICAGO, ILLINOIS.

INSTRUMENT FOR LOCATING BURIED OBJECTS.

1,351,556.  Specification of Letters Patent.  Patented Aug. 31, 1920.

Application filed March 19, 1918. Serial No. 223,346.

*To all whom it may concern:*

Be it known that I, WILLIAM S. DARLEY, a citizen of the United States, and a resident of the city of Chicago, county of Cook and State of Illinois, have invented certain new and useful Improvements in Instruments for Locating Buried Objects, of which the following is a specification.

My invention relates to improvements in instruments for locating buried objects, such as service boxes, curb boxes, and the like, used in water and gas distributing systems, the object of the invention being to provide a simple and efficient device of this character which is capable of convenient and efficient use at night or in darkness.

The invention consists in the combinations and arrangements of parts hereinafter described and claimed.

Figure 3:
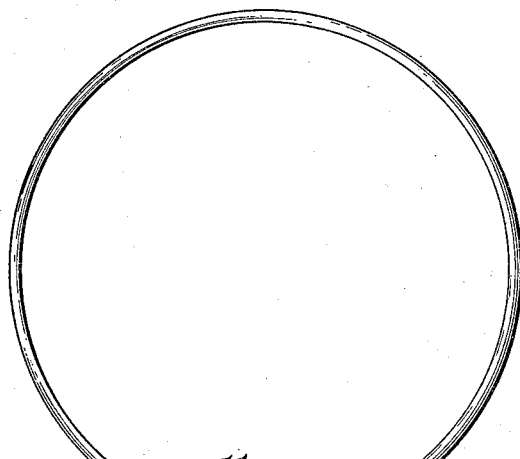
Figure 3:
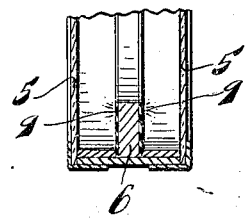
Figure 1:
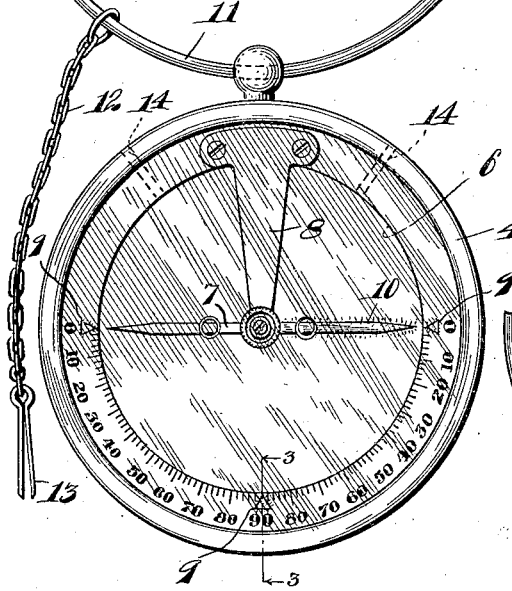
Figure 2:
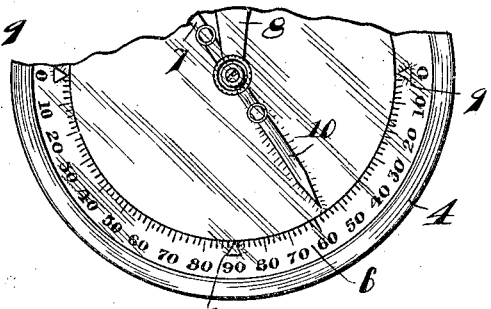

The invention will be best understood by reference to the accompanying drawings forming a part of this specification, and in which, Figure 1, is a face view of an instrument embodying the invention and shown in position of use, Fig. 2, a partial face view of the same indicating a partial deflection of the magnetic needle therein as in use, and Fig. 3, an enlarged section taken on line 3—3 of Fig. 1.

The preferred form of construction as illustrated in the drawings, comprises a disklike casing 4, the opposite sides of which consist of glass plates 5 permitting of a free and uninterrupted view of the interior. A ring 6 is arranged centrally in said casing immediately adjacent the outer periphery thereof and a magnetic needle 7 is pivoted centrally in said casing on a suitable bracket 8, said needle being balanced to assume normal horizontal position when unaffected by the proximity of magnetic objects. The ring 6 is provided with a scale on each side, graduated from 0 at the termini of the horizontal diameter to 90 at the lower terminus of the vertical diameter as shown, the needle 7 coöperating with said scale, which serves to indicate vertical deflections of said needle. The 0 and 90 points on the scales are indicated by triangular patches 9 of luminous radium paint or coating material, which is luminous in the dark, and the magnetically attracted end 10 of needle 7 is also coated on both sides with the same luminous material. The casing 4 is equipped with a ring 11 by which the same may be readily carried suspended in a vertical position, and a chain 12 is loosely secured to ring 11 and equipped with a cotter pin 13 adapted to be inserted in either of two perforations 14 provided in casing 4 and ring 6, said cotter pin serving to receive one or the other points of needle 7 to hold the same against vibration when the instrument is not in use.

In use the needle 7 is freed by withdrawing cotter pin 13, and the instrument suspended in vertical position by carrying the same through the medium of ring 11. When the instrument is thus carried over a buried magnetic object such as a service, curb box, or the like, used in water and gas distributing systems, the magnetic needle 10 will be attracted by said buried object and will assume vertical relation when brought directly over said buried object. It is frequently necessary and desirable to employ such an instrument at night or in underground passageways which are dark. When so used, the luminous points 9 and the luminous end of needle 7 are visible, thus permitting of ready and efficient use of the instrument in darkness.

While I have illustrated and described the preferred form of construction for carrying my invention into effect, this is capable of variation and modification without departing from the spirit of the invention. I therefore, do not wish to be limited to the precise details of construction set forth, but desire to avail myself of such variations and modifications as come within the scope of the appended claims.

Having described my invention, what I claim as new and desire to secure by Letters Patent is:—

1. A device of the class described comprising a casing; a magnetic needle pivotally mounted in said casing, there being an opening in the wall of said casing registering with the path of movement of said needle; and a retaining device insertible through said opening to engage the point of said needle to prevent rotation thereof, substantially as described.

2. A device of the class described comprising a casing; a ring constituting a handle for said casing; a magnetic needle pivotally mounted in said casing, there being an opening in the wall of said casing registering with the path of movement of said needle; a chain fastened to said ring; and a cotter pin on said chain and insertible through said opening to engage the point of said needle, substantially as described.

3. A device of the class described comprising a casing; a magnetic needle pivotally mounted in said casing, there being an opening in the wall of said casing registering with the path of movement of said needle; a flexible element secured to said casing; and a cotter pin on said flexible element and insertible through said opening to engage the point of said needle, substantially as described.

In testimony whereof I have signed my name to this specification in the presence of two subscribing witnesses.

WILLIAM S. DARLEY.

Witnesses:
   JOSHUA R. H. POTTS,
   HELEN S. LILLIS.